(No Model.) 4 Sheets—Sheet 2.
W. MANN & W. T. WALKER.
APPARATUS FOR THE PURIFICATION OF COAL GAS.
No. 245,527. Patented Aug. 9, 1881.
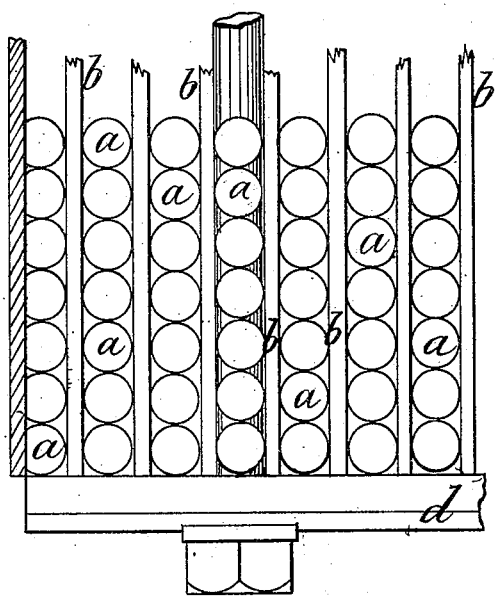
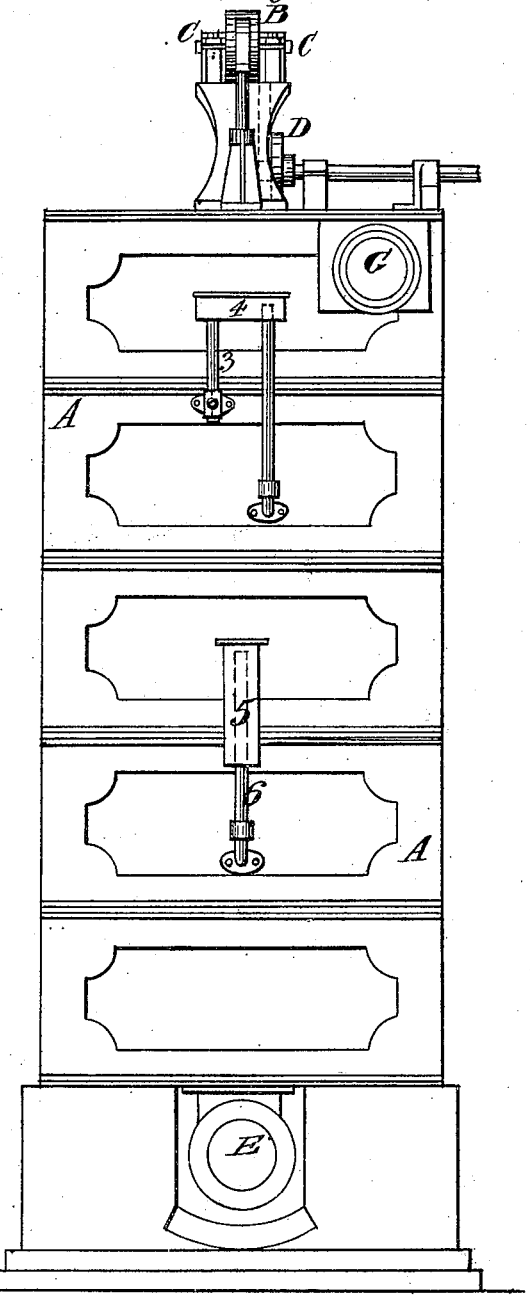

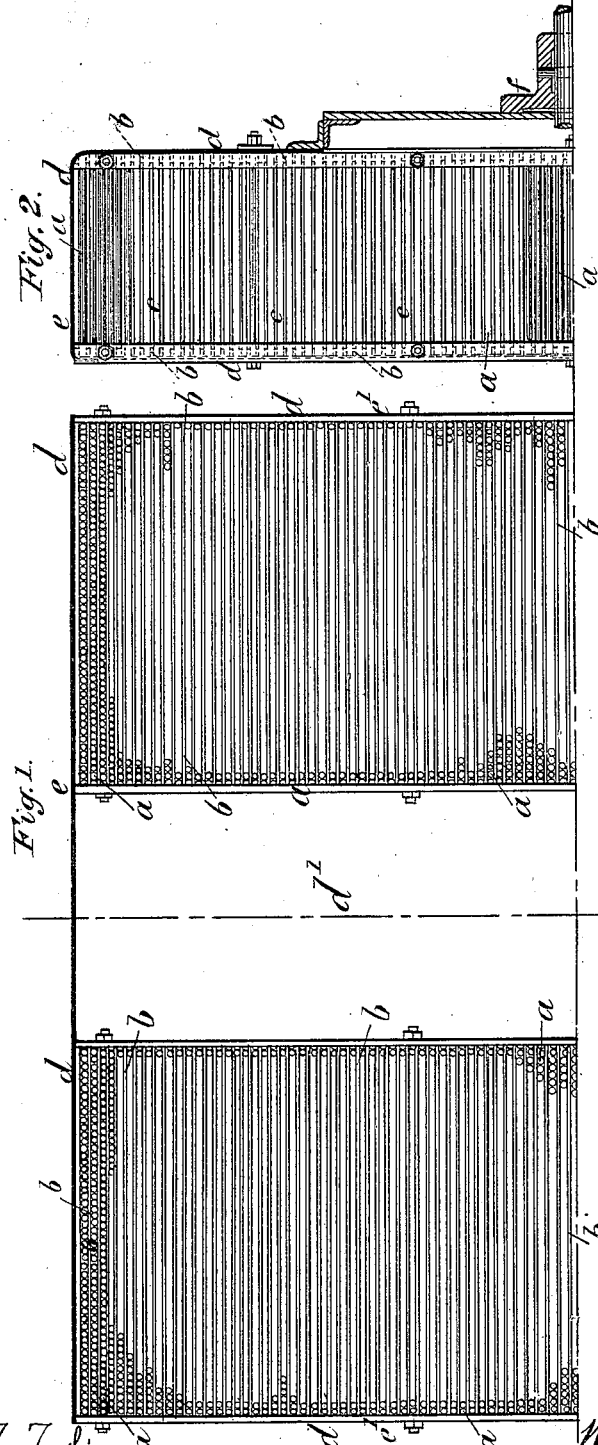

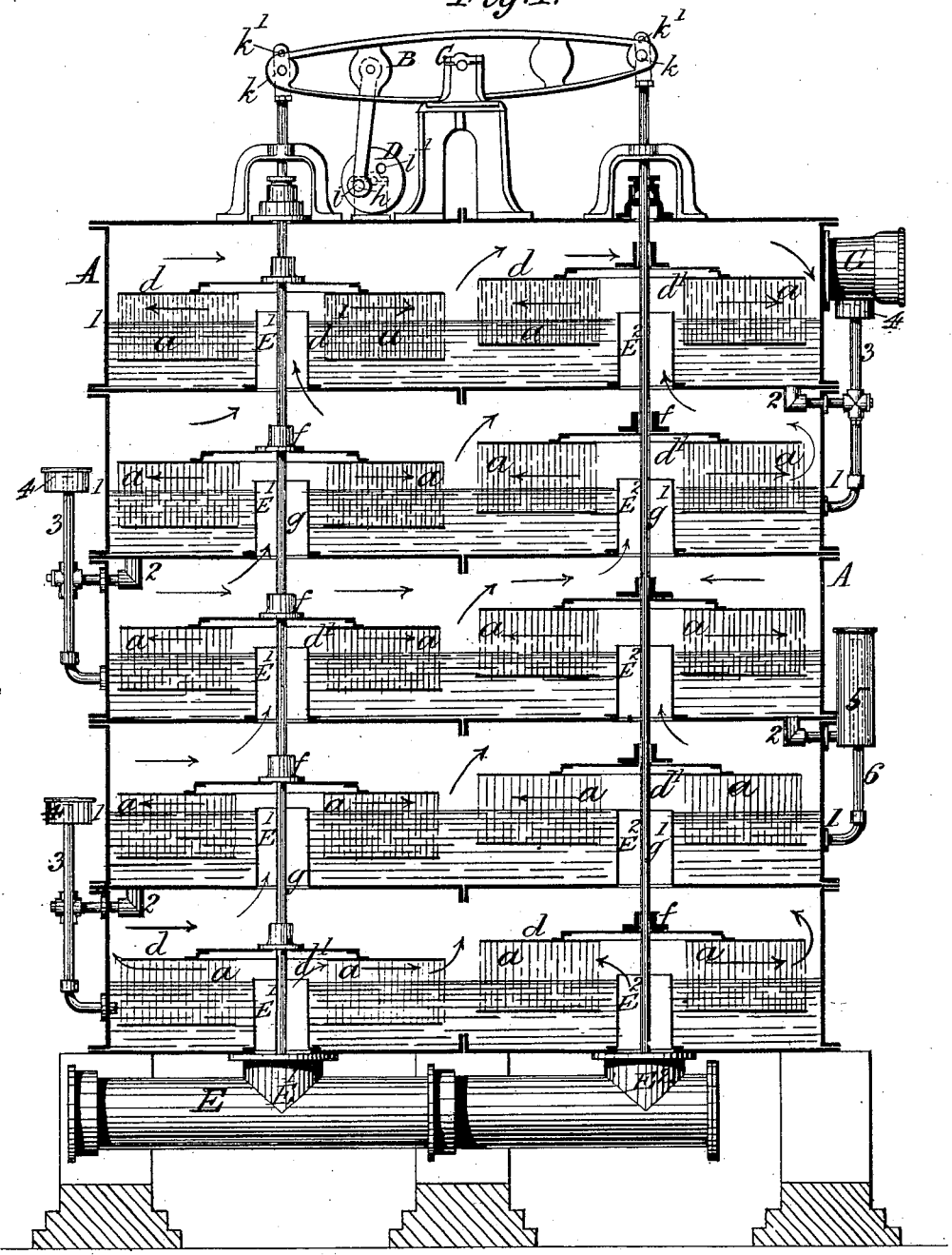

(No Model.) 4 Sheets—Sheet 4.
W. MANN & W. T. WALKER.
APPARATUS FOR THE PURIFICATION OF COAL GAS.
No. 245,527. Patented Aug. 9, 1881.
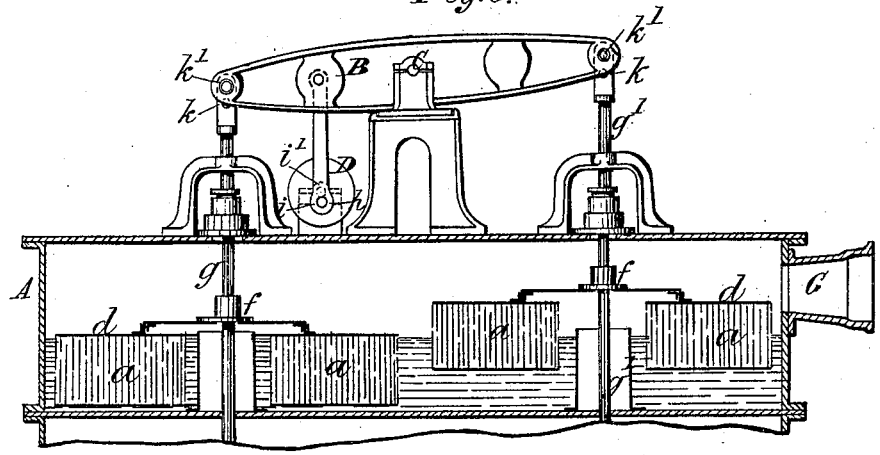
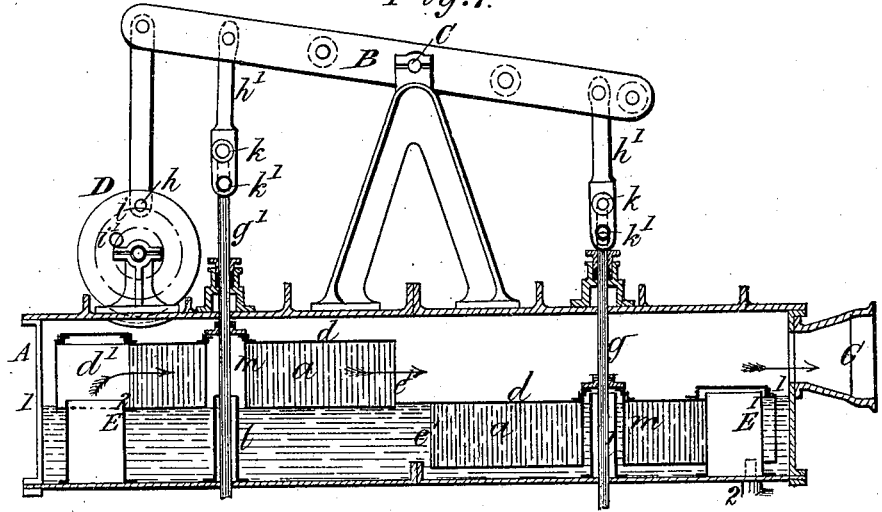

UNITED STATES PATENT OFFICE.

WILLIAM MANN, OF GUNNERSBURY, AND WILLIAM T. WALKER, OF HIGHGATE, COUNTY OF MIDDLESEX, ENGLAND.

APPARATUS FOR THE PURIFICATION OF COAL-GAS.

SPECIFICATION forming part of Letters Patent No. 245,527, dated August 9, 1881.

Application filed November 22, 1880. (No model.) Patented in England April 10, 1880.

*To all whom it may concern:*

Be it known that we, WILLIAM MANN and WILLIAM THOMAS WALKER, subjects of the Queen of Great Britain and Ireland, WILLIAM MANN residing at Gunnersbury, WILLIAM THOMAS WALKER residing at Highgate, both in the county of Middlesex, England, have invented certain Improvements in Apparatus for the Purification of Coal-Gas, (for which we have obtained a patent in Great Britain, No. 1,478, dated April 10, 1880,) of which the following is a specification.

Our said invention relates to that description of apparatus for the purification of coal-gas in which plates or equivalent scrubbing devices are employed, forming elongated passages for the gas, the said plates, or their equivalents, being caused to present a constantly-fresh wetted surface to act upon and intercept the impurities in the gas as it passes along the same.

It is well known that a large extent of surface filmed over with water will, when exposed to the flow of a gas containing ammonia, cause the water to become impregnated with this impurity, so that when it flows out of the vessel in which the absorbing action is set up it is an ammoniacal liquor of strength commensurate with the completeness of the arrangement. It is also generally known that any liquid reagent presented in a similar manner will remove any impurity for which it has an affinity, and that the more this reagency or absorbing power can be exercised by extension of surface without interruption to the flow of the gas the more adaptable to the purposes of the gas-manufacturer will be the apparatus. Again, the more tortuous and numerous the ways are through which the gas has to travel, provided that they are properly supplied with absorbing or reacting fluid, the more potent will be the absorbing or reacting power of the said fluids when exposed to the flow of the gas.

Now, our said invention has reference, partly, to improved scrubbing devices, whereby we obtain a very large amount of wetted surface within a small compass, and at the same time reduce the cost of the apparatus by reason of the inexpensive construction of the said devices. Our said invention, however, also comprises improvements in the general arrangement of the purifying apparatus, and also in the mode of withdrawing the overflow from the several tanks, so as to maintain the same free from tarry or other dense matter.

In carrying out our said invention we construct the scrubbing devices of a series of rods or bars, of wood or other suitable material, and of any convenient shape or section, arranged side by side and in rows, with intervening distance-pieces, so as to form elongated passages for the gas. These scrubbing devices we mount in tiers upon vertical rods or spindles in a superposed series of tanks containing purifying-liquid, and we employ two or more of such vertical rods or spindles, with their scrubbing devices arranged in connection with each other, in such a manner that the scrubbing devices are alternately immersed in the liquid and raised partially out of the same, one set being in course of depression or immersion when the other set is in course of elevation or emersion.

For the purpose of operating the scrubbing devices we connect the vertical rods or spindles to a rocking beam or lever driven by a steam-engine or other suitable prime mover, in order to obtain the required continuous alternating motion.

We are aware that it has been heretofore proposed to so mount a pair of scrubbing devices on a rocking beam that one scrubber will be immersed while the other is raised, and vice versa; but in the case referred to the beam was mounted within the gas-casing and the scrubbers hung to the beam by cords or chains.

In our machine, as above indicated, the scrubbers are mounted on two or more vertical rods or spindles passing through stuffing-boxes in the casing and connected to a rocking lever on the outside. We also take the overflow from the several tanks from the bottom thereof, in order to maintain the same free from tarry or other dense matter, the lower strata of the fluid being discharged from tank to tank.

In order that our said invention may be fully understood, we shall now proceed more particularly to describe the same, and for that purpose shall refer to the several figures on the annexed sheet of drawings, the same letters of reference indicating corresponding parts in all the figures.

Figure 1 of the accompanying drawings represents a horizontal section of one-half of a scrubbing device constructed according to our said invention. Fig. 2 is a transverse section of the same; and Fig. 3 is a detail horizontal section, drawn to the natural size, of a portion of the scrubbing device. Fig. 4 is a vertical section of a series of superposed tanks with two sets of the scrubbing devices applied thereto. Fig. 5 is an end view of the same, and Fig. 6 is a detail hereinafter referred to. Fig. 7 is a vertical section of a portion of the apparatus, illustrating a modification.

Referring to Figs. 1, 2, and 3, the scrubbing device consists of any suitable number of rows of rods or bars, $a$, of wood or other suitable material, which may be either round, as shown, or square, or of any other suitable shape and section, the rods or bars of each row being placed in intimate contact or a short distance apart from each other, while the several rows are maintained separate the one from the other by means of distance-pieces $b$, so as to leave a series of narrow passages, $c$, for the gas. The rods or bars, with their distance-pieces thus arranged, are secured in a frame, $d$, which is closed at the top and on the sides $e\ e$, but is open at the ends $e'\ e'$. The frame is provided with a boss, $f$, for attachment to the vertical spindle $g$, carrying and actuating the scrubbing devices.

Figs. 4 and 5 illustrate the mode of applying these devices for effecting the purification of coal-gas.

A are a series of tanks, arranged one above the other, and containing water, (for example,) the supply of which is so regulated as to maintain the approximately constant level indicated at 11. Within these tanks are placed two sets of scrubbing devices, carried respectively on rods or spindles $g\ g'$, two of the scrubbing devices being contained in each tank of the apparatus. The upper ends of the rods or spindles $g\ g'$ (passing to the exterior through stuffing-boxes) are connected to a rocking beam or lever, B, which is mounted outside upon a center or fulcrum, C, at the top of the apparatus, and receives motion through the intervention of a crank-disk, D, from a steam-engine or other suitable prime mover.

The two sets of devices are so arranged that when one set is submerged beneath the liquid in the tanks the other set will be partially raised out of the liquid, the two sets being alternately immersed in the liquid and elevated under the continuous rocking motion of the beam or lever, by which continuous motion the full area of the gas-passages is constantly maintained without check—that is to say, there is no moment of time in which the thoroughfare or passage is not maintained equal in area to the inlet or supply pipe. The gas is admitted at the bottom at E, and, passing up through the branch pipes E' E², enters the central spaces, $d'$, of the bottom scrubbing devices, $d$, of both sets in the lowest tank. The current of gas is then divided to the right and left hand sides of the central spaces of both of the lowest scrubbing devices, passing between the wetted rods or bars, and, giving up a portion of its ammonia, it thence ascends the pipes E' and E² of the tank next above and passes through the wetted rods or bars, as before described, and so on in succession throughout the whole series of tanks A until it arrives at the top, whence it finally escapes at G in a purified condition. The arrows in Fig. 4 indicate the course of the gas.

In order to adapt the apparatus to suit the different production of gas in winter and summer, the crank-pin $h$ and the connection of the spindles $g\ g'$ with the rocking beam or lever B are made adjustable, so that the lift or stroke which gives the quantity of wetted surface of the scrubbing devices may be varied, while the position at the bottom of the stroke remains unaltered.

In our drawings we have shown two holes, $i\ i'$, in the crank-disk D for the crank-pin $h$, and two holes, $k\ k'$, are provided in the head of each of the spindles $g\ g'$, for their attachment by means of a bolt to the rocking beam or lever B, so as to admit of the spindles being practically lengthened or shortened, as required. In the position of the parts shown in Figs. 4 and 5 the crank-pin $h$ is inserted in the hole $i$ of the crank-disk $d$ and the connecting-bolts of the spindles are passed through the holes $k$ of the spindles. The scrubbing devices therefore receive the full stroke necessary to adapt them to operate upon the maximum quantity of gas required for consumption in winter. By removing, however, the crank-pin $h$ and the connecting-bolts of the spindles from the holes $i\ k$ and inserting them in the holes $i'\ k'$, respectively, the stroke of the spindles is reduced, and they, with their scrubbing devices, are lowered bodily. (See Fig. 6.) The scrubbing devices in their lowest position will then be submerged beneath the liquid, and when in their highest position they will be elevated to a reduced height, so as to expose only a sufficient surface for operating upon the diminished quantity of gas required for summer consumption; or we accomplish the same result by means of a screw motion or its equivalent, the center bearing of the beam being made adjustable, and thereby raise or lower the beam as required.

It is obvious that the rocking beam employed may consist of a lever of an order different to that shown in Figs. 4, 5, and 6—such, for example, as is indicated in Fig. 7. This figure also illustrates a modification in the arrangement of the scrubbing devices, in which the gas-inlets are at one end of each device in lieu of at the center, as in the arrangement previously hereinbefore described, and the gas passes from the space $d'$ through the spaces $c$ to the single open end $e'$ of each device, the tubes $l$ and sealing-caps $m$ being provided for the purpose of maintaining a tight joint without friction. In this example, also, the holes $i\ i'$, to admit of the adjustment of the connection of the spindles $g\ g'$ with the rocking beam or lever B, are shown as formed in links $h'$, depending from the beam or lever.

In order that the liquid required for purification may be maintained at a uniform level in the tanks, it is requisite to discharge the overflow or surplus from the tanks. As, however, the tarry or other dense matter settles at the bottom, we provide at the bottom of each tank an opening and pipe, 2, which conducts the lower strata containing the tarry or dense matter into a pipe, 3, which, turning upward, ascends to the level of the interior height of the fluid, entering a receiver-box, 4, and then descends to the tank immediately below, and so on in succession throughout the series of tanks to the bottom tank, whence the liquid containing the tarry or dense matter is finally discharged; or the same object may be obtained by means of a vertical receiver-box, 5. (Shown at the central portion of Fig. 5.) The liquid entering from the tank at the bottom ascends to the necessary height, and thence ascends by the central tube, 6, to the tank immediately below, and so on in succession throughout the series of tanks, as hereinbefore explained. The liquid in the tanks is thus maintained clear and free from dense matter, which result cannot be attained by discharging the overflow or surplus from the top, as in that case the clear liquid is drawn off, while the dense matter accumulates in the tanks.

The arrangement lastly hereinbefore described, in which the overflow from one tank is discharged into the tank immediately below, and the overflow from that tank to the tank next below, and so on in succession throughout the series of tanks, is generally suitable when one and the same liquid reagent is employed in all the tanks. When, however, it is required to use different reagents, and in other cases where found advantageous, the tanks may be divided into sets, the tanks of each set being connected together in the manner hereinbefore described, so that the dense matter is drawn off from the bottom and discharged from tank to tank throughout the set. For example, all the alternate tanks may be connected together, thus forming two sets, or each third tank may form one of a separate set, the residual matter from the tanks of each set being thus kept separate, in lieu of its being allowed to commingle, as would be the case if such matter were conducted through the whole of the tanks of the apparatus in succession.

We also prefer to regulate the supply of liquid to the tanks by means of a hydrometer so arranged, in connection with a balanced vessel or float in a cistern containing the liquid which has flown from the washer, that as the specific gravity of the liquid in the tanks varies the hydrometer will cause the balanced lever to rise or fall more or less, and, acting on the supply valve or cock, will thus regulate the supply-valve of liquid according to the requirements of the operation.

By the use of our said invention the gas is operated upon under conditions the most advantageous for effecting its purification. The current of gas is finely divided by being caused to pass through a large number of narrow elongated passages, each of which, from the mode of construction adopted, presents a wetted surface of a large area for contact with the gas, while the whole is contained within a small compass, and is capable of being cheaply produced.

We do not desire to claim, broadly, gas-scrubbers having a series of bars or rods arranged side by side or adjacent to each other, nor do we desire to claim, broadly, a pair of scrubbers carried by a rocking beam for alternately raising them out of and depressing them into the water; but

We claim as our invention—

1. A gas-purifier consisting of a casing with inlet and outlet for the gas, and containing rows of bars or rods, the bars or rods of each row closely adjoining each other, and the rows separated from each other by distance-pieces, so as to leave a series of narrow passages, $c$, for the gas, all substantially as set forth.

2. In a gas-purifier, the combination of a tank having inlets and an outlet, with a rocking beam on the outside, and two or more vertical rods carrying scrubbers within the tank, and passing through stuffing-boxes in the latter and connected to the opposite ends of said beam, all substantially as described.

3. In a gas-purifier, the combination of a series of tanks with an outlet-pipe opening into the bottom of the tank, a receiver, and a tube extending up into said receiver and communicating with a tank below, all substantially as described.

In testimony whereof we have signed our names to this specification in the presence of two subscribing witnesses.

WILLIAM MANN.
WILLIAM THOMAS WALKER.

Witnesses:
A. FEATHERSTONE,
C. I. R. WILKINS.